United States Patent [19]
McDonald et al.

[11] Patent Number: 6,012,127
[45] Date of Patent: Jan. 4, 2000

[54] MULTIPROCESSOR COMPUTING APPARATUS WITH OPTIONAL COHERENCY DIRECTORY

[75] Inventors: Edward A. McDonald, Baton Rouge, La.; James M. Ottinger, Duluth, Ga.; Harry W. Scrivener, III, Columbia, S.C.

[73] Assignee: Intel Corporation, Santa Clara, Calif.

[21] Appl. No.: 08/989,371

[22] Filed: Dec. 12, 1997

[51] Int. Cl.[7] .................................................. G06F 12/08
[52] U.S. Cl. .................................. 711/141; 714/5
[58] Field of Search ........................ 711/119, 141, 711/144, 145, 146; 714/1, 2, 3, 5, 8

[56] References Cited

U.S. PATENT DOCUMENTS

| | | | |
|---|---|---|---|
| 5,025,365 | 6/1991 | Mathur et al. | 364/200 |
| 5,265,232 | 11/1993 | Gannon et al. | 395/425 |
| 5,404,489 | 4/1995 | Woods et al. | 395/425 |
| 5,446,863 | 8/1995 | Stevens et al. | 395/427 |
| 5,604,882 | 2/1997 | Hoover et al. | 395/448 |
| 5,608,878 | 3/1997 | Arimilli et al. | 395/287 |

*Primary Examiner*—Eddie P. Chan
*Assistant Examiner*—Kevin L. Ellis
*Attorney, Agent, or Firm*—Blakely, Sokoloff, Taylor & Zafman LLP

[57] ABSTRACT

A multiprocessor computing apparatus including a plurality of processors each having a cache memory and preferably arranged in nodes on a system bus. A first cache coherency providing mechanism coupled to the processors for achieving system level cache coherency. A second cache coherency providing mechanism is also provided. When an error is detected in the first cache coherency providing mechanism, this mechanism is disabled and cache coherency is achieved by the second cache coherency providing mechanism. In a preferred embodiment, the first mechanism includes coherency directories and the second mechanism includes bus snooping.

16 Claims, 3 Drawing Sheets

MULTIPROCESSOR COMPUTING APPARATUS WITH OPTIONAL COHERENCY DIRECTORY

RELATED APPLICATIONS

The present application is related to U.S. patent application Ser. No. 08/980,882, entitled SYSTEM AND METHOD FOR RELIABLE SYSTEM SHUTDOWN AFTER COHERENCY CORRUPTION, filed on Nov. 25, 1997, in the names of the above-listed inventors. This related application is commonly assigned to the assignee of the present application and is hereby incorporated by reference as if fully set forth herein.

FIELD OF THE INVENTION

The present invention relates to multiprocessor (MP) computer systems and, more specifically, to optionally disabling coherency directories therein.

BACKGROUND OF THE INVENTION

The term "coherency" and more particularly "cache coherency" as applied to MP computer systems refers to the process of tracking data that is moved between local memory and the cache memories of the multiple processors. For example, in a typical MP environment, each processor has its own cache memory while all of the processors (or a subset of all the processors) share a common memory. If processor 1 requests particular data from memory, an investigation must be made to determine if another processor has already accessed that data and is holding the most updated copy in that processor's cache memory. If this has occurred, the updated data is sent from that processor's cache memory to processor 1 and the read from memory is aborted. Thus, coherency or cache coherency refers to the process of tracking which data is in memory and which data has a more recent version in a processor's cache. While achieving coherency in an MP computing system is challenging, the challenge is increased when the multiple processors are clustered in subsets on local buses that are connected by a system bus (as shown in FIG. 1).

The prior art includes many techniques for achieving coherent cache operation. One well known technique is bus snooping and there is literature describing various bus snooping approaches.

Another technique utilizes a coherency directory. A coherency directory, in a basal form, consists of memory coupled to a local memory that tracks which processor or processor clusters have cached versions of a line for a particular memory entry. When processor 1 requests specific data in memory, the memory controller for that memory determines whether the requested data is available for transfer. The coherency directory will indicate if the data has been accessed by one or more processors and where those processors are located. Amongst other features, coherency directories permit efficient cache coherency within a computer system having a distributed or multi-level bus interconnect.

A disadvantageous aspect of coherency directories, however, is that they will occasionally fail due to their implementation in solid state memory devices and also due to problems in interconnected circuitry. Failure of coherency directories (direct failure or through failure of related components), may lead to dramatic system crashes, the loss of valuable data and the inability of the system to carry on even at a reduced performance level.

SUMMARY OF THE INVENTION

Accordingly, it is an object of the present invention to provide a multiple processor computing apparatus that provides optional use of a coherency directory.

It is another object of the present invention to provide such a multiple processor computing apparatus that provides an alternative coherency mechanism when the coherency directory is disabled.

It is also an object of the present invention to provide a multiple processor computing apparatus that detects when an error related to the coherency directory has occurred and initiates a controlled shut down and reboot using an alternative coherency mechanism.

These and related objects of the present invention are achieved by use of a multiprocessor computing apparatus with optional coherency directory as described herein.

One embodiment the present invention includes a plurality of processors, each of said processors having a cache memory; a first cache coherency providing mechanism coupled to said processors; a second cache coherency providing mechanism coupled to said processors; logic that detects faulty operation in said first cache coherency providing mechanism; and logic that in response to the detection of faulty operation is said first coherency providing mechanism disables said first coherency providing mechanism and implements cache coherency in said computing apparatus with said second cache coherency providing mechanism. The first mechanism may include a coherency directory and the second mechanism may include bus snooping.

Another embodiment of the present invention includes a plurality of processors each having a cache memory, said plurality being distributed in nodes along a system bus, each node including a plurality of processors; a first cache coherency providing mechanism coupled to said processors that provides system level cache coherency; a second cache coherency providing mechanism coupled to said processors that provides at least node level cache coherency; logic that detects faulty operation in said first cache coherency providing mechanism; and logic in communication with said detection logic that optionally disables said first cache coherency providing mechanism. The disabling of the first mechanism may be achieved through BIOS logic that reconfigures said computing apparatus such that processors therein do not see the first mechanism when the detection logic has detected faulty operation therein.

The attainment of the foregoing and related advantages and features of the invention should be more readily apparent to those skilled in the art, after review of the following more detailed description of the invention taken together with the drawings.

DETAILED DESCRIPTION

Although the text that follows describes the present invention in a symmetric multiprocessing system, it should be clearly understood that this is by way of illustration only. Those skilled in the art will understand that the principles of the present invention may readily be incorporated in a wide variety of multiprocessor systems, including but not limited to non-uniform memory access (NUMA), replicated memory cluster (RMC), cache coherent NUMA (CC-NUMA), massively parallel processing (MPP), and other like systems, in order to improve performance.

Figure 1:
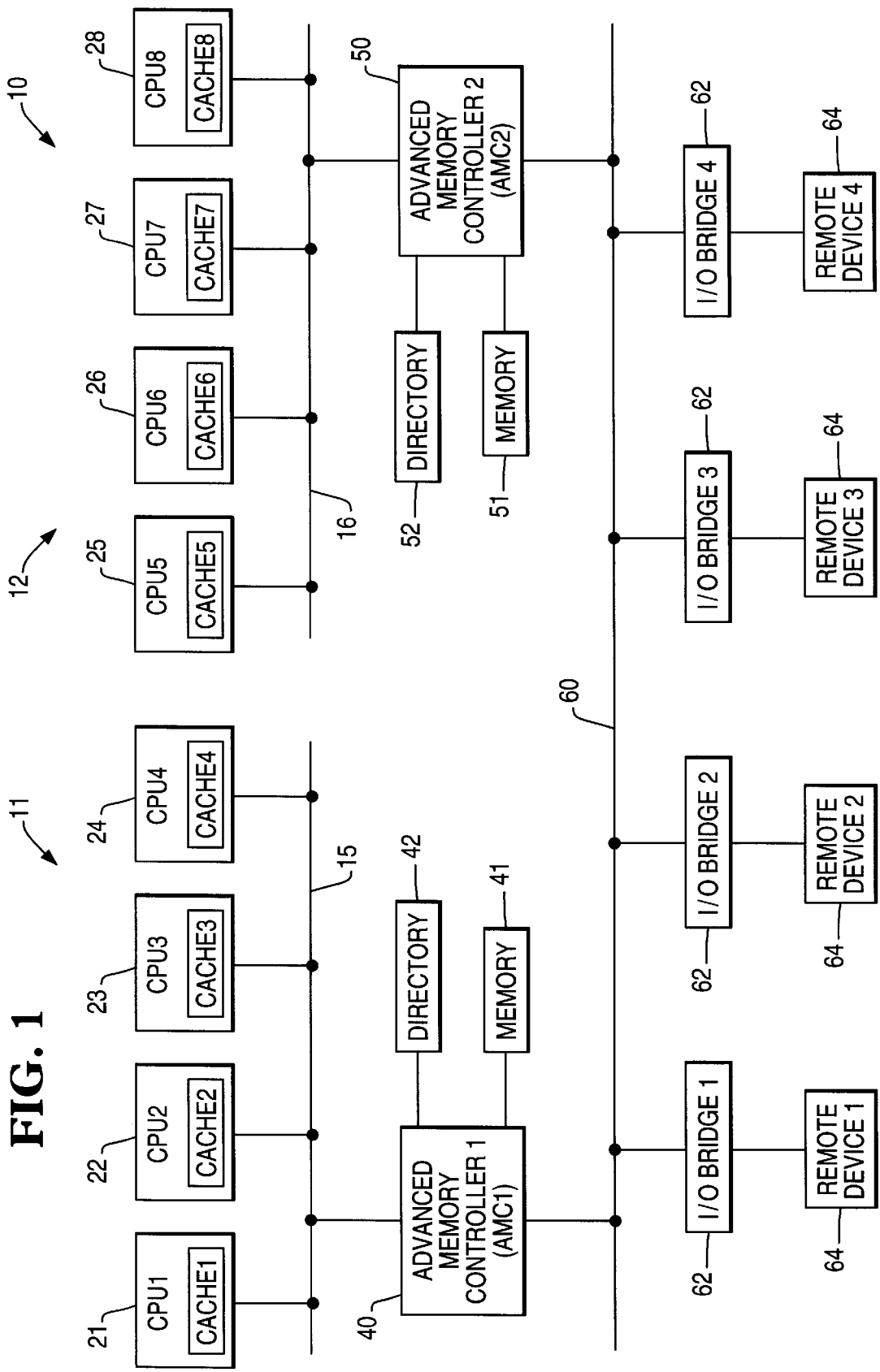
FIG. 1 is a block diagram of a multiple processor computing system in accordance with the present invention.

Referring to FIG. 1, a block diagram of a multiple processor computing system in accordance with the present invention is shown. System 10 includes a multiplicity of processors (eight in the representative embodiment of FIG. 1) 21–28. A first subset of four processors 21–24 is connected to a first local bus 15 and a first memory controller 40, while a second subset of four processors 25–28 is connected to a second local bus 16 and a second memory controller 50. In a preferred embodiment, the processors are Intel Pentium Pro™ processors, while the local buses are Intel P6 busses.

Each memory controller 40,50 is connected to local fast access memory (normally DRAM) 41,51 and a coherency directory 42,52, respectively. The combination of a memory controller and its local memory, coherency directory and subset of processors may be referred to as a node (i.e., first node 11, second node 12, etc.). The memory controllers and the nodes that they are in are interconnected by a system bus 60.

System bus 60 provides both communication between nodes and communication between a node and an external/remote device. The external/remote devices may be PCI, ISA and EISA devices 64 and the like, such as mass storage devices and Ethernet connections, and they are coupled to system bus 60 through I/O bridges 62. Suitable system bus architectures and the connection of peripheral devices are generally known in the art. In a preferred embodiment, the system bus comprises the Intel PCI I/O chipset and is implemented using the Pentium Pro bus topology.

Memory controller 40,50 controls the transfer of data between a processor and local memory, a processor and a device connected through an I/O bridge and a processor and a remote memory (for example, between processor 22 and memory 51). Amongst other componentry, each memory controller 40,50 contains a local bus interface 43, a system bus interface 44, control logic 45, coherent directory interface and test logic (CDITL) 46, a status register 47 and a coherency directory status bit 48. These components are discussed in more detail below with reference to FIG. 2. U.S. patent application Ser. No. 08/760,126, entitled COMPUTER SYSTEM INCLUDING MULTIPLE SNOOPED, MULTIPLE MASTERED SYSTEM BUSSES AND METHOD FOR INTERCONNECTING SAID BUSSES and filed on Dec. 3, 1996, discloses a suitable memory controller, though other memory control devices that achieve control of local and remote memory data transmissions are known in the art. Application Ser. No. 08/760,126 is commonly assigned to the assignee of the present application and is hereby incorporated by reference as if fully set forth herein.

It should be noted that the system architecture shown in FIG. 1 with subsets of processors coupled to local buses that are interconnected by a system bus is gaining popularity in multiprocessor systems. A problem of conventional single shared bus architecture is that there are undesirable physical and electrical limits to the number of processors that can be present on the bus.

Figure 2:
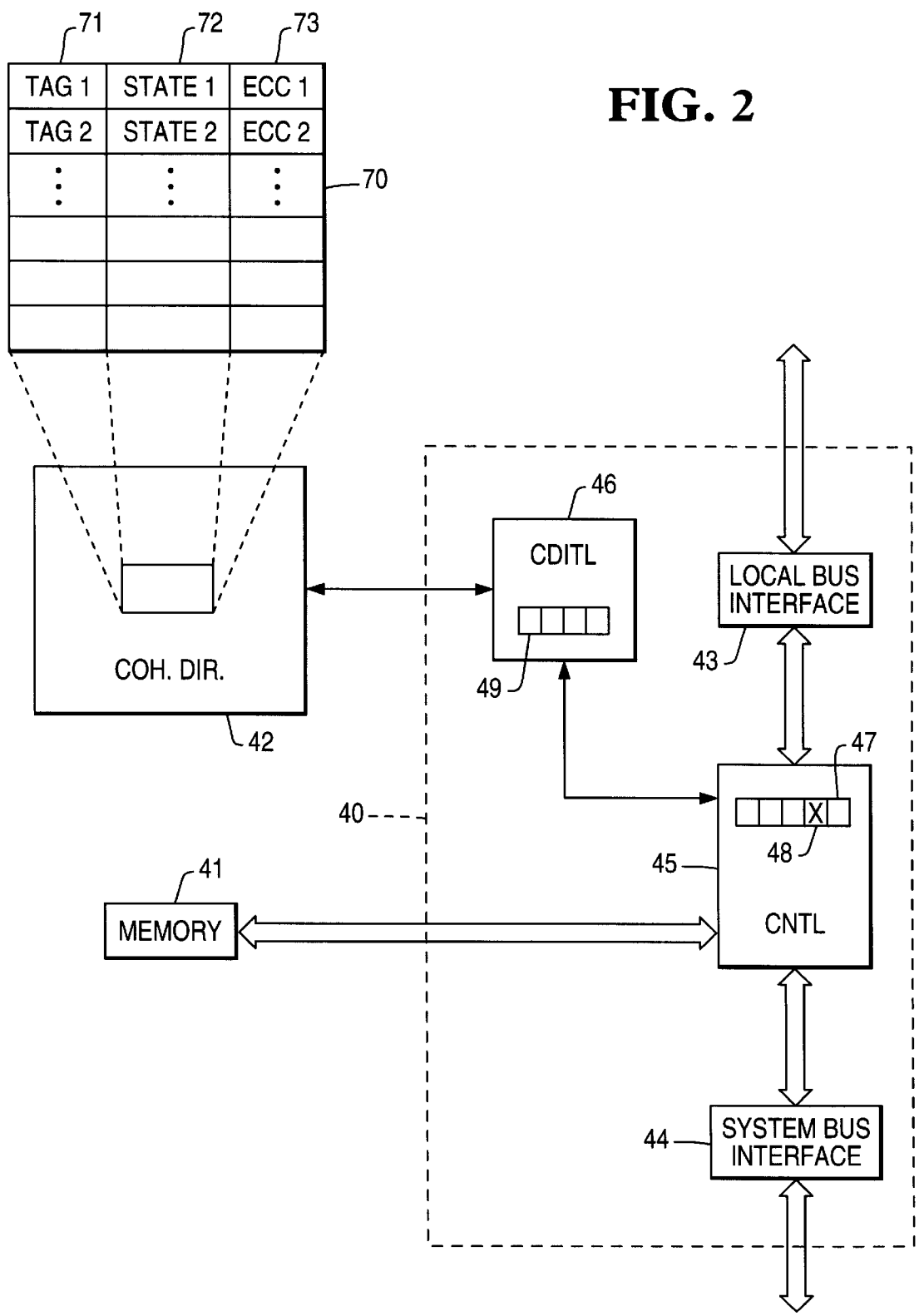
FIG. 2 is a block diagram of a node of the computer system of FIG. 1 in accordance with the present invention.

Referring to FIG. 2, a block diagram of one node of system 10 of FIG. 1 in accordance with the present invention is shown. Since the node that contains memory controller 40 is substantially the same as the node that contains memory controller 50, only one node (node 11) is now discussed though it is to be understood that the teachings now recited for node 11 apply to the operation of node 12, etc.

Coherency directory 42 contains a memory line status table (MLST) 70 (a subset of which is represented diagramatically in FIG. 2). Entries in the table contain a tag, a state and an error checking and correction (ECC) field 71–73, respectively, as discussed in more detail below. A function of MLST 70 is to identify which processors have which lines of memory in their associated cache memories. When a processor requests data, the MLST identifies where the most recent, or current, copy of the data resides.

In operation, memory controller 40 sends a physical address (received from a processor) to coherency directory 42 to determine if the cache line addressed by the physical address is currently cached in any of the processors 21–28. In an exemplary embodiment, the physical address comprises thirty address bits, A(29:0), wherein A(29:26) constitute an address tag, A(25:5) constitute an address index and the five least significant bits, A(4:0), are used to address individual bytes in the 32-byte cache line. Since memory controller 40, local memory 41, and processors 21–28 preferably transfer entire cache lines during each transaction, address bits A(4:0) are not utilized.

The N entries in coherency directory 42 are indexed from 0 to N−1 by indexing the address index. In the exemplary embodiment, address bits A(25:5) may address $N=2^{21}=2,097,152$ directory entries. Within the coherency directory, the address tag bits are stored in tag field 71, the state bits are stored in state field 72 and the ECC bits are stored in ECC array field 73.

During a directory cache write operation, a decoder (not shown) uses the address index to select the corresponding cache entry. The address tag of the current physical address is saved in the tag field, the state information for the corresponding cache line is stored in the state field and the ECC bits, which preferably are generated by memory controller 40, are stored in the ECC field. During a cache read operation, the decoder again uses the address index to access the corresponding cache entry.

The coherency operations of memory controller 40, memory 41 and directory 42 may be described as follows. When a read or write operation accesses memory 41, the state bits in directory 42 are read to determine the coherency operation that must be performed, according to an established protocol. If the stored address tag matches the address tag of the current physical address (a HIT), then the corresponding coherency operations are performed and the state bits are updated. If the stored address tag does not match the address tag of the current physical address (a MISS), then the coherency operations for the default state are performed (possibly none) and the address tag, state bits and ECC bits corresponding to the current physical address and the cache line that it addresses are stored in a corresponding fields of directory 42. This may possibly replace an existing directory entry, so that coherency operations are required to bring the replaced state bits to the default state.

Memory controller 40 includes circuitry that supports operation of the coherency directory. This circuitry includes local bus interface 43, system bus interface 44, control logic 45 and coherency directory interface test logic (CDITL) 46.

CDITL 46 is capable of conducting diagnostic tests on the memory locations of the coherency directory. These tests normally consist of writing a defined data pattern to particular memory locations, reading back the data and comparing the written data to that read back. This and like tests are preferably performed during boot (though they may be performed at other times). If the test generates an unacceptable error (e.g., an uncorrectable error), then the memory controller sets bit 48 in status register 47 to a state that indicates that a coherency directory unacceptable error has occurred. Bit 48 is read by the boot controlling processor after the diagnostic test is complete.

While CDITL 45 will detect most coherency directory unacceptable errors, it is possible that the error checking code in this logic will not detect all errors. Unacceptable errors not detected by the CDITL may be detected later during normal system operation by the processors and/or other systems agents, directly or indirectly. For example, a possible system coherency failure condition may result from local bus protocol tracking errors that reset the state machines of the agents (e.g. processors) attached to the local bus. Resetting these agent state machines may result in the non-completion of pending coherency state changes. Non-recoverable events such as these result in a high priority non-maskable interrupt (NMI) that is preferably distributed to each processor. Each processor then enters its interrupt service routine as discussed below.

Figure 3:
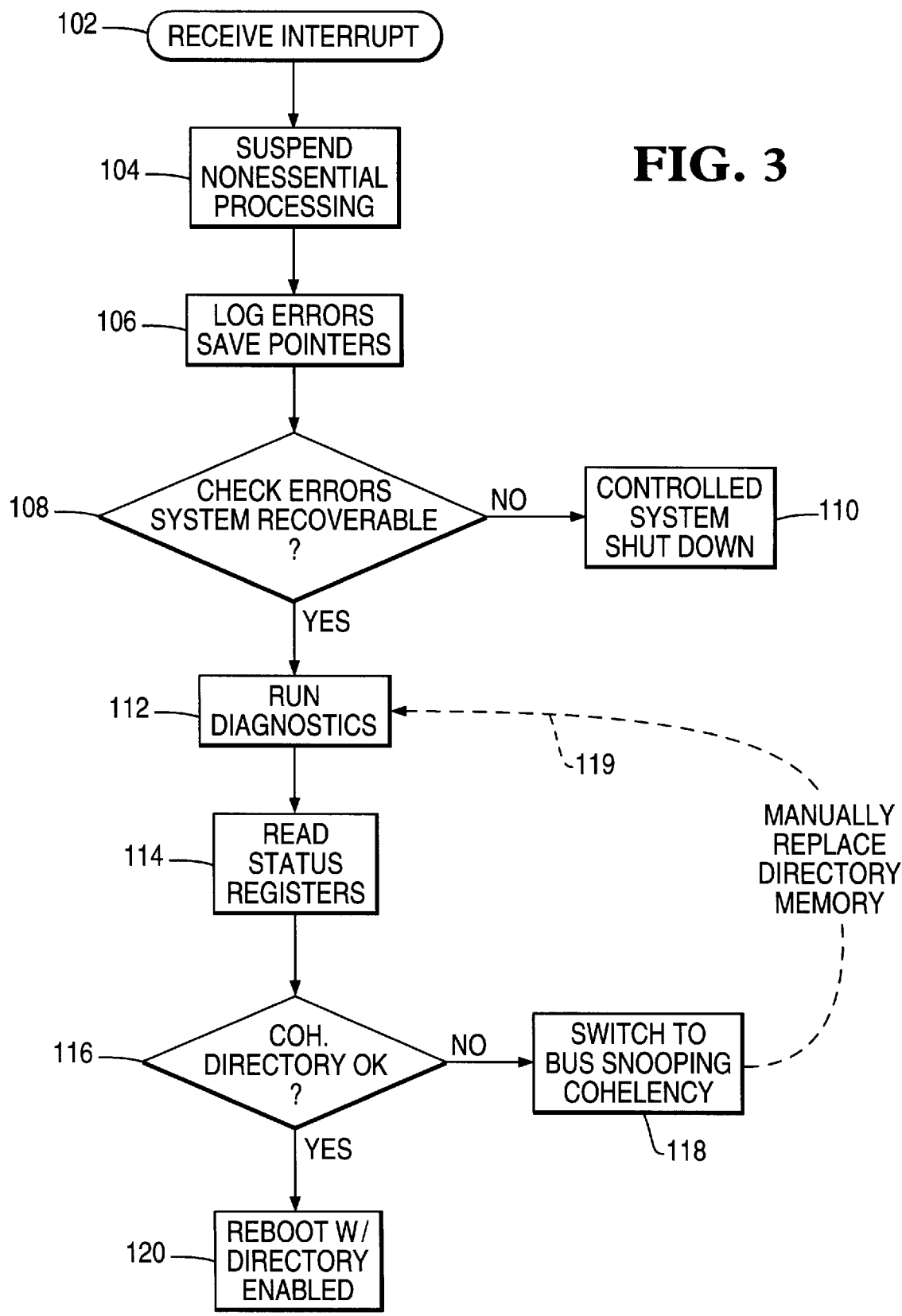
FIG. 3 is a flow diagram of a protocol for responding to a detected coherency directory fault and restarting the system in an appropriate manner in accordance with the present invention.

Referring to FIG. 3, a flow diagram 100 of system restart protocol in response to a coherency directory error in accordance with the present invention is shown. As alluded to above, a coherency directory error will often be detected during initial boot diagnostics or during diagnostics run as a result of an error detected during normal system operation. Since the sequence of events from the detection of an error after diagnostics is the same (regardless of whether the error was detected during initial boot or in response to a system operation error), only one flow diagram is provided in FIG. 3. It is to be understood that an initial boot operation would enter the flow diagram at the conducting diagnostics step (step 112) because diagnostics are run as part of the system boot procedure.

Step 102 indicates receipt of a high level system NMI. This interrupt is not necessarily indicative of a coherency directory error, but of a class of significant system affecting errors. In response to this interrupt, each processor suspends non-essential processing, logs error and saves vulnerable data that can be saved (steps 104,106). A processor is preferably selected that parses the error code and condition information in a manner known in the art to determine if the system can be recovered (step 108). If the system is unrecoverable, a controlled shut down is preferably performed (step 110). If the system is recoverable (or potentially recoverable), then further diagnostic tests are performed (step 112). These tests include conventional diagnostic tests and the coherency directory data pattern test described above and the like.

In step 114, status registers containing the results of the diagnostic tests are read. If bit 48 is set (step 116), then the following actions are taken. In a preferred embodiment, the system configuration is restricted in BIOS by defining the system configuration for each cluster to include only the processors in that cluster (step 118). Thus, when control is passed to the OS of the processors in a particular cluster, the valid memories and caches that can be accessed by those processors are the memories and caches within that node.

Furthermore, CDITL 46 includes a register 49 that indicates which of a plurality of nodes the coherency directory may operate in. When a coherency directory unacceptable error is indicated in diagnostics, BIOS inserts a value in register 49 that effectively disables access to the coherency directory (i.e., disable reads and writes to coherency directory locations). Alternatively, if no error is indicated in diagnostics, then BIOS may insert a value in register 49 that enables the coherency directory.

Cache coherency within the nodes is achieved using the bus snooping technology of the processors and the local bus as described above. With respect to data exchanges between a device connected through an I/O bridge and a processor, these exchanges are preferably executed using known direct memory access (DMA) techniques. To preserve coherency for the DMA data, all DMA requests are propagated to the local bus so that the local bus' snooping protocol can perform the requisite coherency operations.

If the diagnostic tests indicate that the coherency directory is not working properly, the SIMMs or other physical memory devices by which a coherency directory is implemented may be replaced by a new device. This manual step is indicated by dashed line 119. The diagnostics of step 112 are run on the new memory device.

If the diagnostics indicate that the coherency directory is functioning properly, the system reboot is continued with the coherency directory enabled and the processors of all nodes are preferably configured by the BIOS to be enabled in the computer system (step 120).

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A multiprocessor computing apparatus, comprising:
   a plurality of processors, each of said processors having a cache memory;
   a first cache coherency providing mechanism coupled to said processors;
   a second cache coherency providing mechanism coupled to said processors;
   logic that detects faulty operation in said first cache coherency providing mechanism; and
   logic that in response to the detection of faulty operation in said first coherency providing mechanism disables said first coherency providing mechanism and implements cache coherency in said computing apparatus with said second cache coherency providing mechanism, in preparation for a shut down.

2. The apparatus of claim 1, wherein said first cache coherency providing mechanism includes a coherency directory.

3. The apparatus of claim 1, wherein said second cache coherency providing mechanism includes bus snooping logic.

4. The apparatus of claim 1, further comprising:
   local memory coupled to said processors;
   a memory controller coupled to said local memory; and
   logical within said memory controller for indicating whether or not said first cache coherency providing mechanism is disabled.

5. The apparatus of claim 1, wherein said plurality of processors includes at least first and second distributed subsets of processors, each subset including a plurality of processors.

6. The apparatus of claim 5, wherein said first cache coherency providing mechanism includes a coherency directory.

7. The apparatus of claim 5, wherein said first and second subsets further comprise respectively first and second local memories and first and second memory controllers respectively connected to said first and second local memories, each of said memory controllers including logic for indicating whether or not said first cache coherency providing mechanism is disabled in that subset.

8. The apparatus of claim 5, wherein said first and second subsets respectively include a first and second coherency directory, said detection logic being capable of detecting faulty operation in at least one of said first and second coherency directories and said disabling logic disabling at least the one of said first and second coherency directories for which faulty operation is detected.

9. The apparatus of claim 8, wherein said disabling logic includes BIOS logic that reconfigures said computing apparatus such that processors therein do not see one of said first or second coherency directories for which the detection logic has detected faulty operation.

10. A multiprocessor computer system, comprising:
 a plurality of processors each having a cache memory, said plurality being distributed in nodes along a system bus, each node including a plurality of processors;
 a first cache coherency providing mechanism coupled to said processors that provides system level cache coherency;
 a second cache coherency providing mechanism coupled to said processors that provides at least node level cache coherency;
 logic that detects faulty operation in said first cache coherency providing mechanism; and
 logic in communication with said detection logic that disables said first cache coherency providing mechanism, upon the detection of faulty operation, in preparation for a shut down.

11. The system of claim 10, wherein said first cache coherency providing mechanism includes a coherency directory.

12. The system of claim 10, wherein said disabling logic includes BIOS logic that reconfigures said computer system such that processors therein do not see components of said first cache coherency providing mechanism when faulty operation is detected therein, said system then operating on node level coherency provided by said second cache coherency providing mechanism.

13. The apparatus of claim 10, wherein said nodes each include a coherency directory, and wherein said detection logic is capable of detecting faulty operation in the coherency directories of the nodes and said disabling logic is capable of optionally disabling at least one of said coherency directories for which faulty operation is detected.

14. The system of claim 13, wherein said second cache coherency providing mechanism provides coherency in a node that has had its coherency directory disabled.

15. The system of claim 14, wherein said second cache coherency providing mechanism includes bus snooping logic.

16. A multiprocessor computing apparatus, comprising:
 a plurality of processors each having a cache memory, said plurality of processors arranged in nodes and each node having a local memory and a memory controller;
 a coherency directory provided in each node for providing system level cache coherency to processors accessing the local memory of that node;
 bus snooping logic provided in each node that provides cache coherency to the processors within that node;
 logic provided with each coherency directory that detects faulty operation in that coherency directory; and
 logic in communication with said detection logic that reconfigures said multiprocessor computing apparatus so that one of said coherency directories in which faulty operation is detected is disabled, in preparation for a shut down.

* * * * *

UNITED STATES PATENT AND TRADEMARK OFFICE
CERTIFICATE OF CORRECTION

PATENT NO.   : 6,012,127
DATED        : January 4, 2000
INVENTOR(S)  : McDonald et al.

It is certified that error appears in the above-identified patent and that said Letters Patent is hereby corrected as shown below:

<u>Column 8,</u>
Line 27, before "processors", insert -- the --.

Signed and Sealed this

Seventeenth Day of June, 2003

JAMES E. ROGAN
*Director of the United States Patent and Trademark Office*